L. WYSS.
CLOCK AND WATCH.
APPLICATION FILED MAY 4, 1921.

1,410,050.

Patented Mar. 21, 1922.

INVENTOR:
Léon Wyss
BY Wm Wallace White
ATT'Y.

UNITED STATES PATENT OFFICE.

LÉON WYSS, OF LA CHAUX-DE-FONDS, SWITZERLAND.

CLOCK AND WATCH.

1,410,050.  Specification of Letters Patent.  Patented Mar. 21, 1922.

Application filed May 4, 1921. Serial No. 466,634.

*To all whom it may concern:*

Be it known that I, LÉON WYSS, a citizen of the Swiss Republic, residing at La Chaux-de-Fonds, Switzerland, have invented new and useful Improvements in Clocks and Watches, of which the following is a specification.

My invention relates to clocks or watches, particularly those designed to be affixed to an automobile or other vehicle, and has for its object the provision of means by which the winding of the spring and the setting of the hands may be accomplished by rotating the bezel.

My invention consists in the construction, combination, and arrangement of parts herein described and claimed, and illustrated in the accompanying drawings forming part of this specification, which illustrate a preferred embodiment of my invention.

Figure 1:
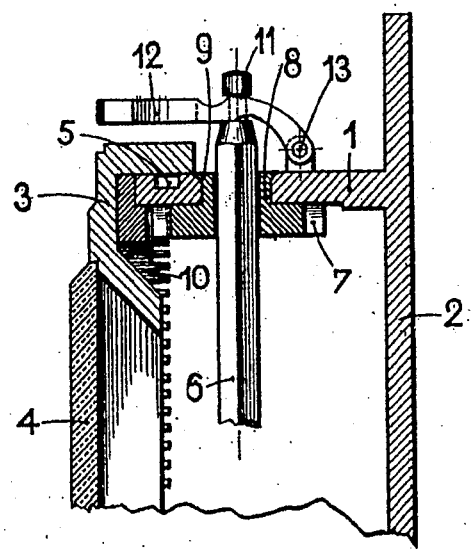
Figure 2:
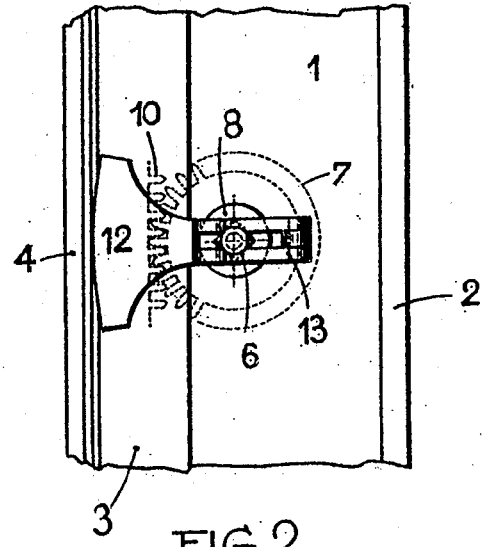

Figure 1 is a partial section through the casing taken approximately along the axis of the stem of a time piece embodying the invention; and Fig. 2 is a top view of part of the timepiece.

Similar characters of reference indicate corresponding parts in all figures of the drawings.

In the embodiment shown, a casing 1 is provided having a base plate 2 by means of which it may be attached to the instrument board of an automobile or the like, the casing 1 being adapted to contain the usual clock or watch mechanism.

Rotatably mounted on the casing 1 is the bezel 3 carrying the usual lens or glass 4 which is located in front of the face of the timepiece. The bezel may be held in place by a screw or pin (not shown) adapted to engage the groove 5 which encircles the casing, thus permitting the bezel to be rotated upon the casing.

The type of timepiece to which this invention is applicable is that which is provided with a stem 6 which is normally urged by a spring or other means (chuck) to one position where it may be rotated to wind the mechanism, and which may be longitudinally moved to another position, and then rotated when it is desired to set the hands, the mechanism actuated by the stem 6 being that in common use, and not shown in the drawing.

The stem 6 has associated with it for rotation therewith a gear wheel or pinion 7, which is preferably provided with a longitudinally extending sleeve portion 8 journaled in the casing 1, and held in place by the flanged portion 9. The stem 6 is longitudinally slidable through the gear 7, but may be squared to fit a corresponding hole in the gear, or otherwise arranged so that rotation of the gear causes the stem to turn.

The bezel 3 is provided with a toothed annular member 10 arranged in mesh with the gear wheel or pinion 7, so that rotation of the bezel, which may be effected by hand, causes rotation of the wheel 7 and stem 6, to wind the spring if the stem 6 is in normal position.

The outer end of the stem 6 preferably projects beyond the casing and is provided with an annular groove 11 adapted to be engaged by a lever 12 pivoted at 13 to the casing, so that draw on the lever 12 causes longitudinal movement of the stem 6 from the normal or winding position to the setting position.

The operation of the device is therefore as follows: To wind the mechanism, turn the bezel 3, which through the toothed member 10 rotates the pinion 7 and hence the stem 6 which operates in the usual manner to wind the spring. To set the hands, draw the lever 12, moving the stem 6 so as to release the winding mechanism and engage the setting mechanism in the usual manner and then turn the bezel 3, thus rotating the stem 6 and thereby the usual setting mechanism.

It will be noted that because of the mounting of the pinion 7 in the casing, the stem 6 is subject only to torsional stress, and any lateral pressure that is transmitted to the pinion 7 from the toothed member 10 is taken up through the sleeve 8 by the casing.

Having now described my invention, I claim and desire to secure by Letters Patent:

1. In a watch or clock, the combination comprising a casing, a stem for winding and setting, a pinion mounted for rotation in the wall of the casing and having a sliding engagement with said stem to rotate the stem, a bezel, and teeth on said bezel arranged to engage and actuate the said pinion.

2. In a watch or clock, the combination comprising a casing, a stem for winding and setting, a pinion mounted for rotation in the wall of the casing and having a sliding engagement with said stem to rotate the stem, a bezel, teeth on said bezel arranged to engage and actuate the said pinion, and means for sliding said stem between winding and setting positions.

3. In a watch or clock, the combination comprising a casing, a stem for winding and setting, a pinion mounted for rotation in the wall of the casing and having a sliding engagement with said stem to rotate the stem, a bezel, teeth on said bezel arranged to engage and actuate the said pinion, and a lever fulcrumed on the casing and engaging said stem to effect movement thereof between winding and setting positions.

In testimony whereof I have signed my name to this specification.

LÉON WYSS.